United States Patent [19]
Cerbelle et al.

[11] Patent Number: 5,891,385
[45] Date of Patent: Apr. 6, 1999

[54] PROCESS FOR SECURING A COMPONENT INSIDE A HOLLOW BODY MADE OF THERMOPLASTIC MATERIAL

[75] Inventors: Lionel Cerbelle, Laval; Serge Percebois, Courbeveille, both of France; Charles Cuvelliez, Rhode-Saint-Genese; Xavier Jacquet, Brussels, both of Belgium

[73] Assignee: Solvay (Societe Anonyme), Brussels, Belgium

[21] Appl. No.: 693,017

[22] Filed: Aug. 6, 1996

[30] Foreign Application Priority Data

Aug. 11, 1995 [BE] Belgium .............................. 09500691

[51] Int. Cl.⁶ .......................... B29C 45/00; B29C 49/20; B29D 22/00
[52] U.S. Cl. .......................... 264/515; 264/516; 264/572
[58] Field of Search ..................... 264/515, 516, 264/572; 220/564, 4.13; 280/830, 7, 833

[56] References Cited

U.S. PATENT DOCUMENTS

| | | |
|---|---|---|
| 3,919,373 | 11/1975 | Kormendi .............................. 264/516 |
| 4,703,771 | 11/1987 | Mimura . |
| 4,719,072 | 1/1988 | Kojima et al. . |
| 4,951,699 | 8/1990 | Lipman . |
| 4,952,347 | 8/1990 | Kasugai . |
| 5,104,472 | 4/1992 | Kasugai et al. ..................... 264/516 |
| 5,197,443 | 3/1993 | Hodgkins . |
| 5,514,323 | 5/1996 | Ramiolle ............................ 264/515 |

FOREIGN PATENT DOCUMENTS

| | | |
|---|---|---|
| 0514555 | 11/1992 | European Pat. Off. . |
| 0571876 | 12/1993 | European Pat. Off. . |
| 55-011846 | 1/1980 | Japan . |
| 55-025380 | 2/1980 | Japan . |
| 55-079121 | 6/1980 | Japan . |
| 56-028831 | 3/1981 | Japan . |
| 2201628 | 9/1988 | United Kingdom . |
| 2236288 | 4/1991 | United Kingdom . |
| 2279606 | 1/1995 | United Kingdom . |

Primary Examiner—Leo B. Tentoni
Attorney, Agent, or Firm—Venable; John W. Schneller; Michael A. Sartori

[57] ABSTRACT

A process for securing a component inside a hollow body essentially made of thermoplastic material includes positioning the component in the hollow body during its manufacture by means of a support. The component is secured by being hot-plated between two opposed faces of the hollow body.

8 Claims, 4 Drawing Sheets

PROCESS FOR SECURING A COMPONENT INSIDE A HOLLOW BODY MADE OF THERMOPLASTIC MATERIAL

FIELD OF THE INVENTION

The present invention relates to a process for securing a component inside a hollow body made of thermoplastic material. It also relates to such a hollow body inside which a component has been secured.

TECHNOLOGY REVIEW

Hollow bodies, for example bottles or storage tanks, are in most cases employed for containing a liquid to which they are substantially impervious. Thermoplastic materials are nowadays widely employed for the manufacture of such hollow bodies, especially in view of their ease of processing into complex shapes, their lightness and their resistance in particular to corrosion. Hollow bodies made of thermoplastic material can be manufactured in particular by extrusion blow moulding.

It is sometimes necessary to place inside hollow bodies some components which must be positioned accurately and secured reliably and durably therein. Such a placing is sometimes difficult or even impossible after the hollow body has been produced, especially in view of the position to be reached and the respective dimensions of the orifices in the hollow body and of the component to be inserted. It is therefore known especially to position the component to be secured before the hollow body is produced, in particular before the blow-moulding mould is closed. The component can thus be introduced inside the parison which is extruded in the mould and can be held therein by means of a rod before the closure of the mould and the blow moulding of the hollow body. Nevertheless such positioning by means of a rod does not make it possible to ensure a sufficient force when the mould is closed to obtain the reliable and durable securing of the component in the hollow body.

It has also been proposed (GB 2279606), besides holding the component in the parison by means of a rod, to preform built-in fittings in the component which are intended to interact with the internal surface of the hollow body. Besides the additional complexity which it engenders, this process does not prevent the quality of the securing of the component in the hollow body from remaining very greatly dependent on the positioning rod. The objective of the invention is therefore to offer a process for securing a component inside a hollow body consisting essentially of thermoplastic material, which is simple and which will permit an accurate positioning and a reliable and durable securing of the component in the hollow body.

SUMMARY OF THE INVENTION

To this end the invention relates to a process for securing a component inside a hollow body essentially made of thermoplastic material, in which the component to be secured is positioned in the hollow body, during its manufacture, by means of a support, which is characterized in that the component is secured by being hot-plated between two opposed faces of the said hollow body.

DETAILED DESCRIPTION OF THE INVENTION

Figure 1:
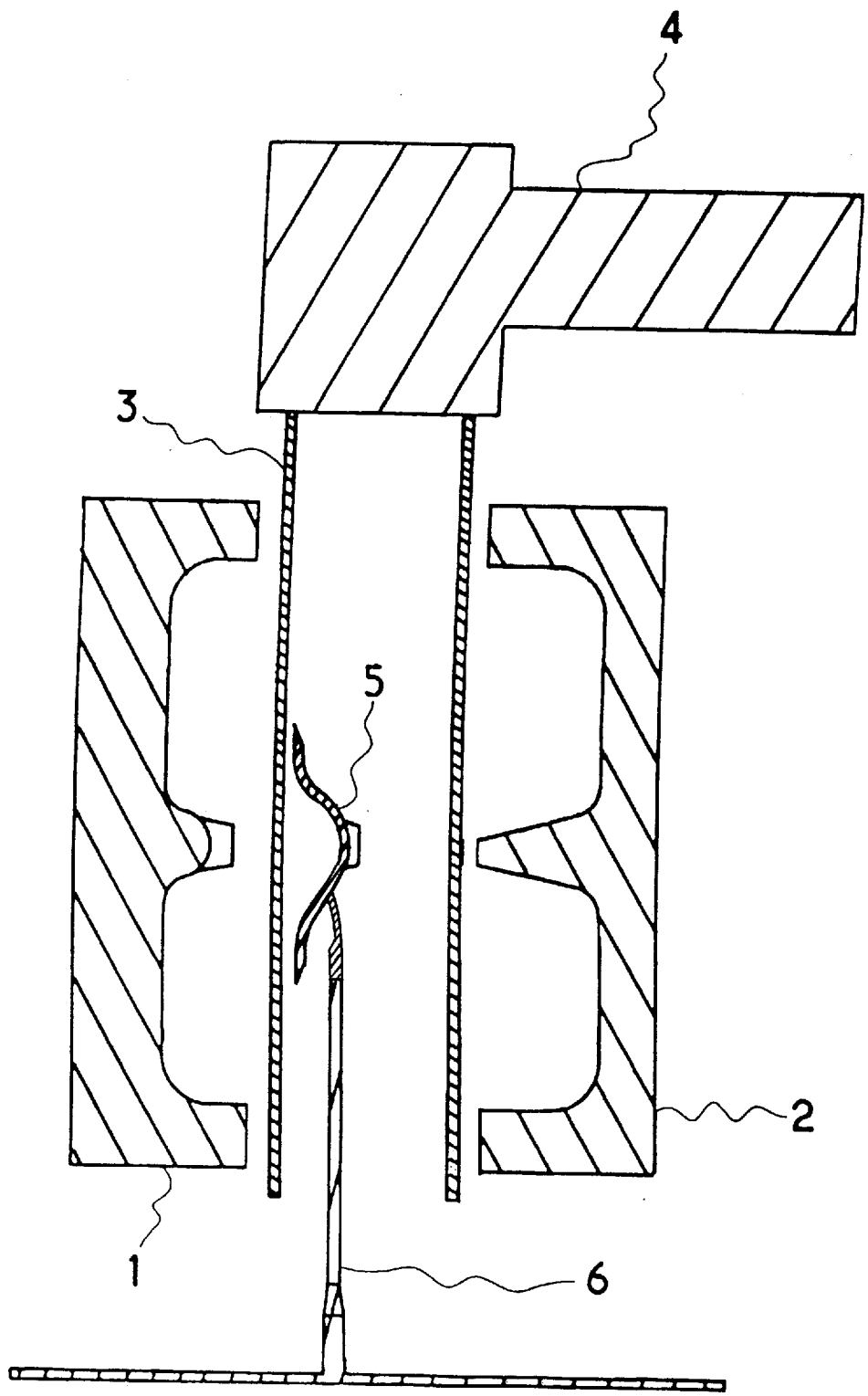
FIG. 1 shows diagrammatically in cross-section a mould for the extrusion blow moulding of a fuel tank for a self-propelled vehicle.

The hollow body is essentially made of thermoplastic material. A thermoplastic material is intended to denote one or more thermoplastic polymers. The polymers may be homopolymers, copolymers or mixtures thereof. Polyolefins or vinyl chloride polymers may be adopted, for example, as such polymers. Good results have been obtained from a polyolefin, in particular a polyethylene. Excellent results have been obtained from a high density polyethylene (HDPE).

One or more common additives, such as antioxidants, stabilizers, pigments or others may obviously be added to the thermoplastic material.

The hollow body as a whole may essentially be made of a single thermoplastic material. It may also include, in particular, a number of layers consisting essentially of different thermoplastic materials.

A support is here intended to denote any means of suitable shape enabling the component to be secured to be positioned and held in the hollow body during its manufacture. In particular, the support may be a rod.

Hot-plating (or pinning while heated) between two opposed faces of the hollow body is intended to denote any technique of assembly with heating by pressure between two opposed faces of the said hollow body, such as especially by welding.

The hollow body may be manufactured by any process. In particular it may be manufactured by welding at least two parts obtained previously by injection. It is preferably manufactured by extrusion blow moulding, by extruding a parison into an open mould, by positioning the component to be secured in the parison by means of the support, by closing the mould and by blow-moulding the hollow body in such a way that the component is secured by being hot-plated between two opposed faces of the hollow body.

The hollow body may be of any known type, especially a bottle or a storage tank. The invention is advantageous in the case of a storage tank intended in particular for a self-propelled vehicle. It is especially advantageous in the case of a fuel tank.

The component may also be of any known type. In particular it is associated with pumping the fluid contained in the hollow body.

The component may be made of any material which is usually known for this purpose. It is preferably essentially made of thermoplastic material as defined above.

The component may be secured in any place in the hollow body. It is advantageously secured in a place where two opposed faces of the hollow body are close together. It is preferably secured by means of a bonding block between two opposed faces of the hollow body. A bonding block between two opposed faces of the hollow body is here intended to denote a local weld between two opposed faces of the hollow body which is obtained during the closure of the mould by an adapted shape of the latter. Such a bonding block may be provided when the hollow body is being designed, especially with a view to improving its rigidity. Failing this, it may be provided therein essentially for securing the component according to the present invention. Whatever the circumstances, its form and its precise position may be advantageously adapted with a view to the securing of the component according to the present invention.

The opposed faces of the hollow body between which the component is secured by being hot-plated may be of any kind. In particular, the upper and lower faces may be adopted as opposed faces, relative to the position envisaged for the normal use of the hollow body.

By virtue of their convenience of manufacture, the hollow bodies may be given specially developed shapes. It is thus possible to produce a hollow body essentially made up of two parts communicating with each other via a narrow upper (in normal use) passage. Such a hollow body may be particularly advantageous in the case of a fuel tank for a self-propelled vehicle, straddling, for example, an exhaust line or a transmission shaft under the narrow passage. Such a form may nevertheless present some specific difficulties, for example, in the case of a storage tank, the creation of two pockets which become independent as the level of liquid which is contained drops and, when a drawing device (pump) exists in only one of the parts, failure in the priming of this device. In the case of a fuel tank for a self-propelled vehicle, this phenomenon may in addition be brought about or promoted by some critical situations (inclines, bends in the road etc.) and may result in the suction supply of fuel being cut off and hence in unplanned engine failures.

To reduce such a risk, the bottom of two parts of a hollow body, in particular of a fuel tank, may be connected by at least one tube. Owing to the dynamic action of the fuel, the air contained in this tube is expelled and a siphon brings the two parts of the storage tank into communication in order to balance the levels therein.

Such a siphon, made up of one or more tubes, is therefore a particular component whose securing inside a hollow body may be found to be especially advantageous.

The invention consequently relates in particular to a process for securing a siphon inside a hollow body essentially made up of two parts communicating with each other via a narrow upper passage and in which the siphon is secured by being hot-plated between the upper face and the lower face of the said hollow body.

The siphon is preferably made essentially of thermoplastic material. Excellent results have been obtained when the siphon is made beforehand by gas-assisted injection moulding. The tubes of which the siphon is composed are thus moulded beforehand with injection of a gas allowing the central vein, still molten, to be expelled in order to produce the cavity of the, or of each, tube.

The process according to the present invention enables a component to be positioned in a particularly precise manner and to be secured in a remarkably reliable and durable manner inside a hollow body.

Another object of the present invention is therefore also a hollow body essentially made of thermoplastic material inside which a component is secured by being hot-plated between two opposed faces of the said hollow body.

For the various definitions relating to this aspect of the invention reference will be made to the definitions given previously of the concepts involved.

The invention applies in particular to a hollow body which is a fuel tank.

The component is advantageously essentially made of thermoplastic material.

The component is preferably secured between the upper face and the lower face of the hollow body, thus defined in relation to the position envisaged for the normal use of the hollow body. Still more preferably, the component is secured by means of a bonding block between the upper face and the lower face of the hollow body.

Excellent results have been obtained with a hollow body essentially made up of two parts communicating with each other via a narrow upper passage and in which the component is a siphon.

The figures which follow illustrate the invention without any limitation being implied.

FIG. 1 shows diagrammatically in cross-section a mould for the extension blow moulding of a fuel tank for a self-propelled vehicle. In this figure a mould consisting of two parts (1) and (2) is open and a parison (3) has been introduced into it by an extruder (4). A siphon (5) has been introduced into the parison and is held therein and positioned by a rod (6).

Figure 2:
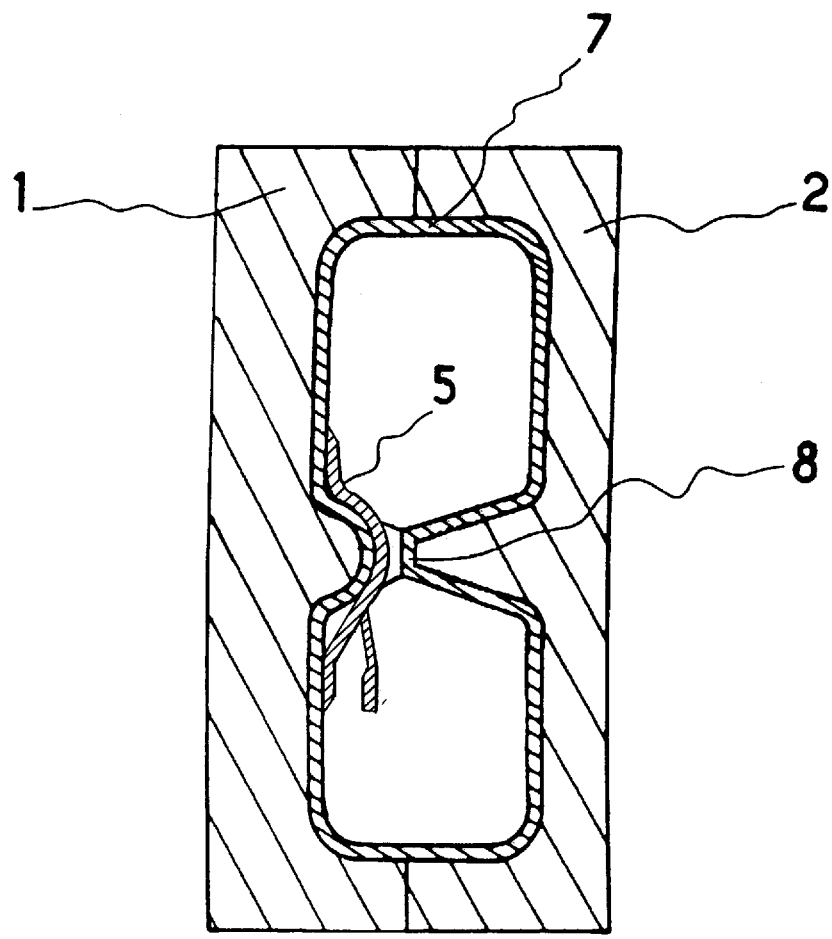
FIG. 2 shows diagrammatically the same mould in a closed position in which a storage tank is formed by blow moulding.

FIG. 2 shows diagrammatically the same mould in a closed position in which a storage tank (7) is formed by blow moulding. In addition, a bonding block (8) can be seen therein, a local weld between the upper face and the lower face of the storage tank, which is obtained during the closure of the mould by an adapted shape of the two parts of the mould in this place. The siphon (5) is hot-plated by means of this bonding block (8) and is secured between the upper and lower faces of the storage tank (7).

Figure 3:
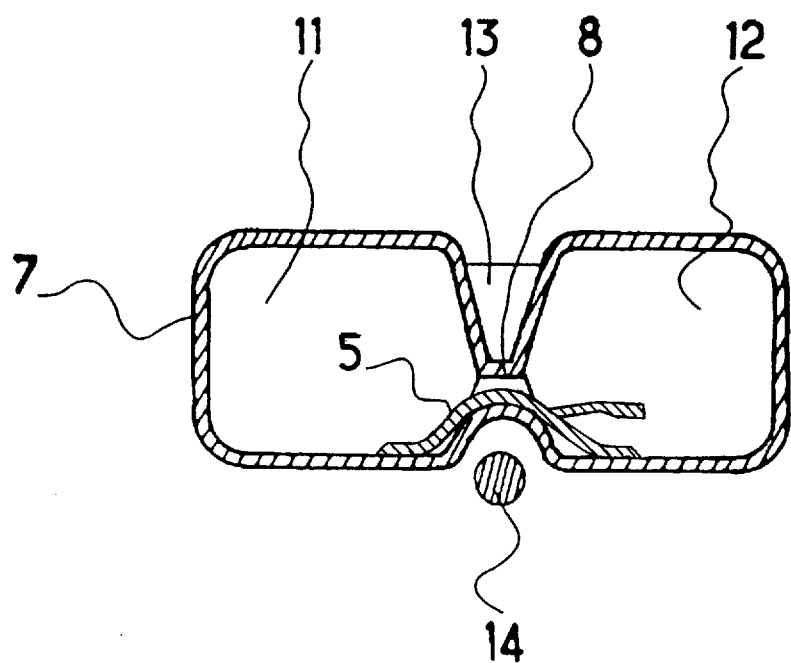
FIG. 3 shows diagrammatically in cross-section a storage tank with a bonding block.

FIG. 3 shows diagrammatically in cross-section a storage tank (7) with a bonding block (8). The storage tank (7) is. essentially made up of two parts (11) and (12), communicating with each other, in sections other than those according to the bonding block, by a narrow upper passage (13). Under this narrow passage (14) the tank (7) can, after being fitted to a self-propelled vehicle, straddle, for example, an exhaust line or a transmission shaft (14). The fuel may be drawn towards the engine intake from the bottom of the part (11) of the storage tank (7). When the fuel level drops below the level of the passage between the two parts of the storage tank the part (12) of the storage tank, not provided with a device for drawing fuel, becomes a "dead" pocket. In addition, the fuel level in this part (12) of the storage tank may be possibly increased, in relation to that in the other part (11), in some special circumstances (inclines, road bends, etc.). To avoid any unplanned interruption in the supply of fuel to the engine in this case, a siphon (5) is secured in the storage tank (7) by means of the bonding block (8) and brings the bottom of the two parts (11) (12) of the storage tank into communication. Thus, as soon as a surge effect due to a motion of the fuel expels all the air contained in the siphon (5) the siphon is primed and balances the levels between the two parts (11) (12) of the storage tank.

Figure 4:
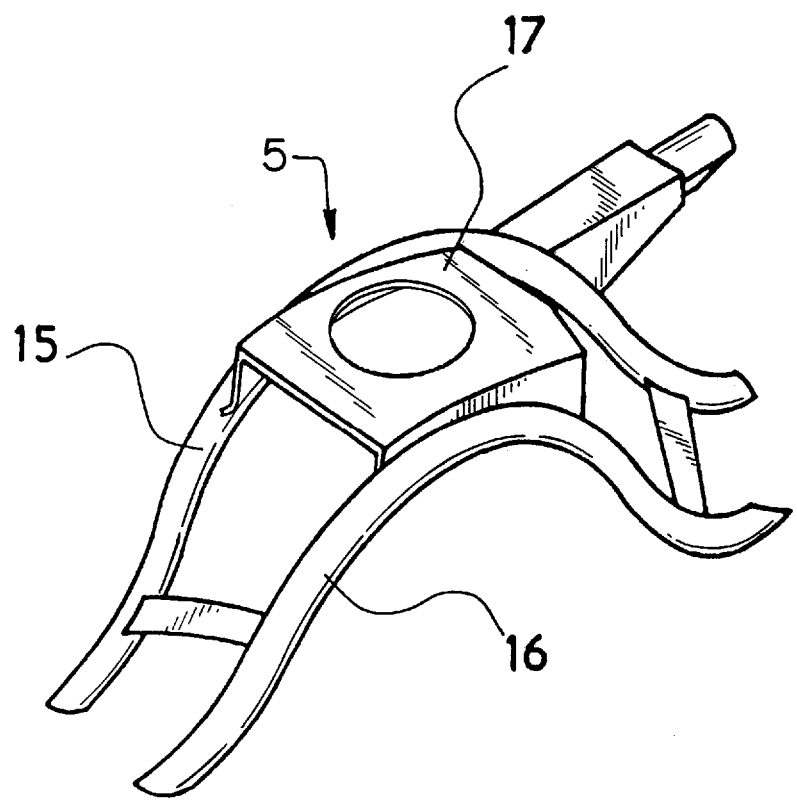
FIG. 4 shows a siphon.

FIG. 4 shows a siphon (5) made up of two tubes (15) (16) and of a central component (17) enabling it to be secured in a storage tank by being hot-plated by means of a bonding block.

What is claimed is:

1. A process for securing a siphon inside a hollow body essentially made of thermoplastic material, comprising the steps of:

positioning said siphon to be secured in said hollow body, during manufacture of said hollow body using a support, and securing said positioned siphon between two opposed faces of said hollow body by hot-plating.

2. The process according to claim 1, further comprising the steps of:

extruding a parison into an open mould prior to positioning said siphon, closing said mould after said siphon is positioned, blow-moulding said hollow body such that said siphon is secured by being hot-plated between the two opposed faces of said hollow body.

3. The process according to claim 1, wherein said hollow body is a fuel tank.

4. The process according to claim 1, wherein said siphon is essentially made of thermoplastic material.

5. The process according to claim 1, wherein said siphon is secured using a local weld bonding block between the two opposed faces of said hollow body.

6. The process according to claim 1, wherein said hollow body is essentially made up of two parts communicating with each other via a narrow upper passage.

7. The process according to claim 1, wherein said siphon is produced by gas-assisted injection moulding.

8. The process according to claim 1, wherein the two opposed faces of said hollow body are an upper face and a lower face of said hollow body, and said siphon is hot-plated between the upper and lower faces of said hollow body.

* * * * *